Oct. 19, 1926.

M. J. NEWHOUSE

ANIMAL TRAP

Filed Jan. 29, 1925

INVENTOR
M. J. Newhouse
BY Davidson & Thompson
ATTORNEYS

WITNESS
H. W. Furst

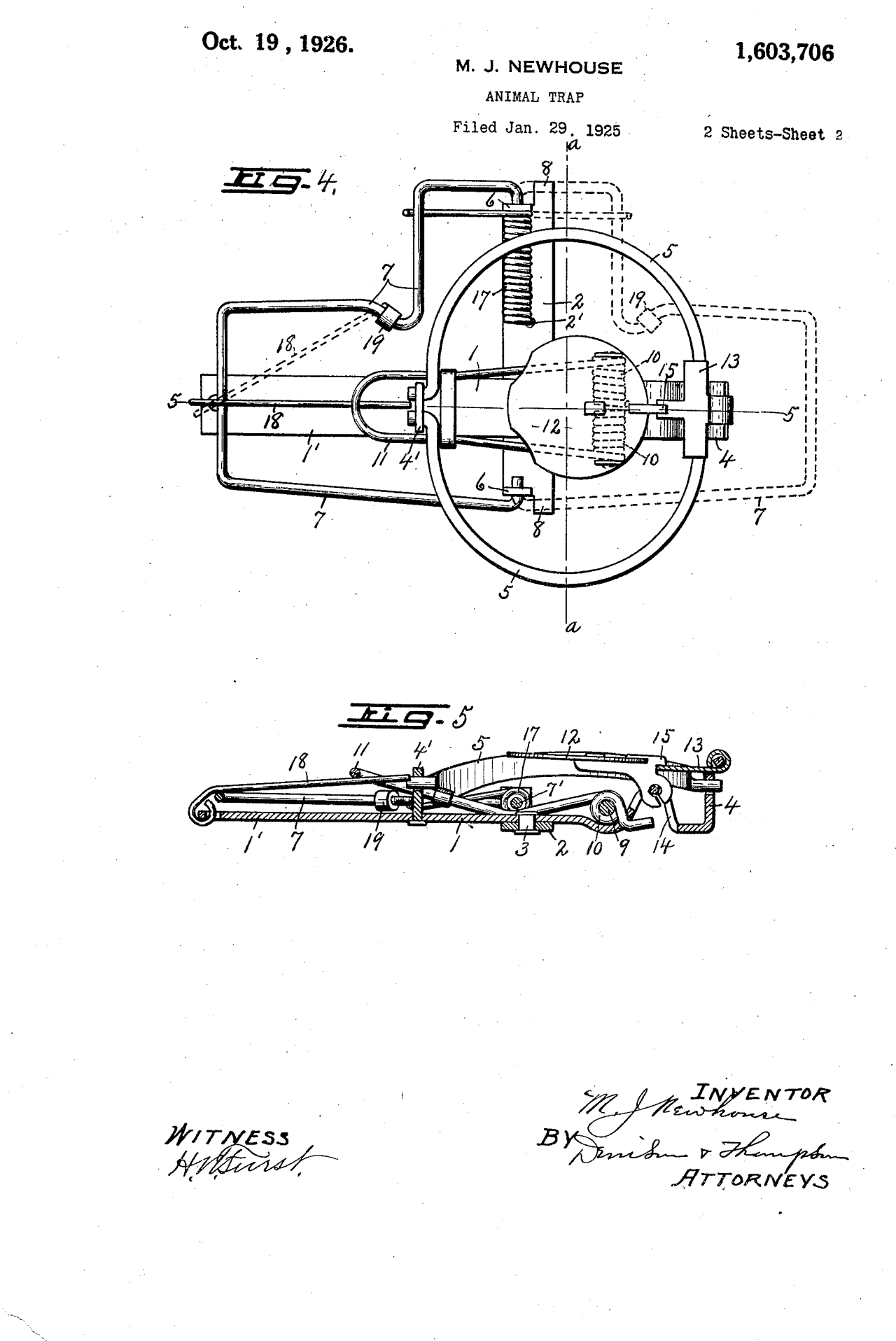

Oct. 19, 1926.

M. J. NEWHOUSE

ANIMAL TRAP

Filed Jan. 29, 1925

Patented Oct. 19, 1926.

1,603,706

UNITED STATES PATENT OFFICE.

MILFORD J. NEWHOUSE, OF ONEIDA, NEW YORK, ASSIGNOR, BY MESNE ASSIGNMENTS, TO ANIMAL TRAP COMPANY OF AMERICA, OF LITITZ, PENNSYLVANIA, A CORPORATION OF PENNSYLVANIA.

ANIMAL TRAP.

Application filed January 29, 1925. Serial No. 5,600.

This invention relates to an animal trap of the class set forth in my pending application, Serial #711,832, filed May 8, 1924, in that it involves the use of a striker bar pivoted to the frame to swing about the axes of a pair of cooperative jaws, the main difference being that the axis of movement of the striker bar is some distance to one side of the transverse centers of the jaws or nearer to one end than to the other end of said jaws.

The object of this offset relation of the axis of the striker bar is to draw the body of the animal inwardly into close relation to the jaws or rather to more effectively cramp the body of the animal around one end of the jaws when trapped between the jaws and thereby to effect a more speedy dispatch of the animal than would be possible with the axis of movement of the striker bar midway between the ends of the jaws.

Another object is to provide a simple and efficient means for temporarily locking the striker bar in each set position against the action of its retracting spring while the jaws are being set and to utilize the same detent to cooperate with the jaw-actuating member for holding the striker bar in its set position after the jaws have been set and thereby to make the operation of the striker bar dependent upon the closing action of the jaws or rather to delay the closing action of the striker bar until after the jaws have been released and partially closed so that the striker bar may finish the work partially accomplished by said jaws.

A further object is to provide the frame with stops projecting into the path of movement of the striker bar near its pivoted ends so as to limit the arc of movement of said striker bar to approximately one hundred and eighty degrees and thereby to prevent undue relaxation of the spring tension.

Other objects and uses relating to specific parts of the trap will be brought out in the following description.

In the drawings:

Figure 1 is a top plan of a trap embodying the various features of my invention, the jaws and striker bar being shown in their "set" or "open" positions.

Figures 2 and 3 are vertical sectional views taken respectively on line 2—2, and 3—3, Figure 1.

Figure 4 is a top plan of a slightly modified form of my invention, the jaws and striker bar being shown in their "set" or "open" positions.

Figure 5 is a vertical sectional view taken on line 5—5, Figure 4.

Figure 1:
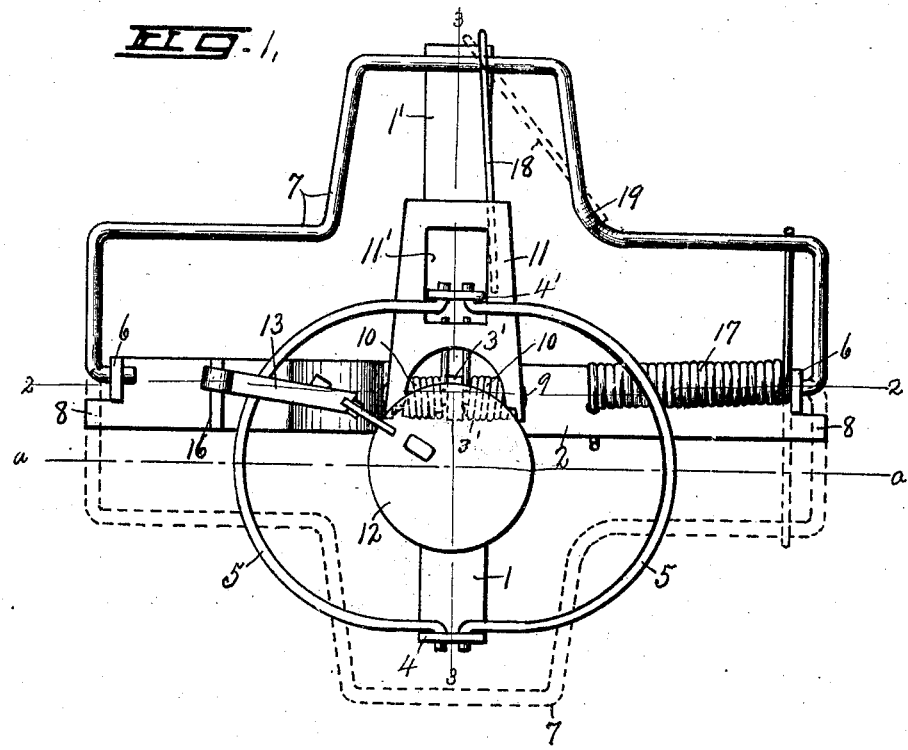
Figure 2:
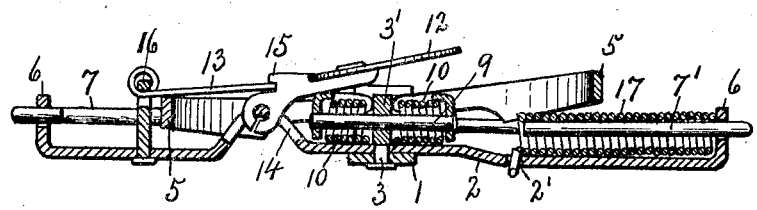
Figure 3:
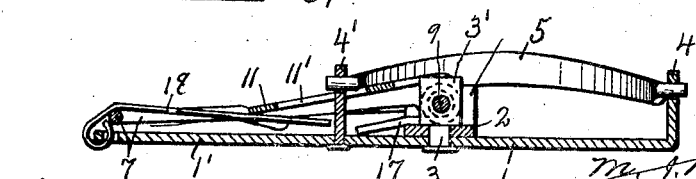

The construction shown in Figures 1, 2 and 3 comprises a main supporting frame consisting, in this instance, of bars —1— and —2— crossing each other between the ends and secured at their crossings by rivets —3— or equivalent fastening means, the cross bar —1— being provided with upstanding apertured lugs —4— and —4'— for receiving and supporting the ends of a pair of movable cooperative jaws —5— which are of considerably less length than the bar —1—, the lug —4— being preferably formed integral with one end of said bar while the lug —4'— is made separately and riveted or otherwise secured thereto, and therefore the jaws are located nearer to one end of the bar than the other, leaving one end as —1'— extending some distance beyond the corresponding ends of the jaws for a purpose presently described.

The offset ends of the bar —2— are provided with upturned apertured lugs —6— for receiving and supporting the inturned ends of a striker bar —7—, said ends being also provided with extensions —8— beyond the lugs —6— and in the path of movement of the adjacent portions of the opposite arms of the striker bar to form stops for limiting the movement of the striker bar under the action of its spring as will be hereinafter explained.

The bars —1— and —2— cross each other at substantially right angles and therefore the axis of movement of the striker bar is at substantially right angles to the axes of movement of the jaws —5— so that the striker bar moves from one extreme position to the other lengthwise of the jaws.

The rivet —3— is provided with a flat head —3'— projecting above the upper face of the bar —2—, as shown in Figures 2 and 3 for receiving a pivotal bolt —9— which extends through and some distance beyond opposite bases of the head —3'— lengthwise of the bar —2— for receiving and supporting a pair of coiled springs —10— and the opposite arms of a jaw actuating plate —11— which is pivotally mounted on the ends of the pin or bolt —9— and extends laterally therefrom lengthwise of and beyond the corresponding ends of the jaws —5— and also lengthwise of the bar —1—, said plate being provided with an opening —11'— for receiving the adjacent ends of the jaws and corresponding lug —4'— and permitting the free end of the plate to be depressed below the adjacent pintles of the jaw.

The springs —10— are coiled around the bolt —9— between the head —3'— and opposite arms of the plate —11—, said springs having one end bearing against the upper face of the bar —2— below the bolt —9— and their other ends extended laterally against the underside of the plate —11— just inside of the adjacent ends of the jaws for exerting upward pressure upon the plate to cross the jaws.

Any suitable means releasable by an animal may be employed for holding the jaws —5— and their operating plate —11— in their set positions, said means consisting, in this instance, of a bait pan —12— and a detent —13—, the heel of the bait pan being pivoted to an upturned portion —14— of the bar —2— at one side of the plate —11— and is provided with a shoulder —15— adapted to be engaged by the free end of the detent —13— which in turn is pivoted to an upstanding lug —16— on the bar —2— outside of the path of movement of the adjacent jaw —5—.

The striker bar —7— is preferably U-shaped and has the ends of its opposite arms arranged outside of the lugs —6— and its ends extended through openings in said lugs for pivotal connection thereto, one of said ends being provided with an extension —7'— projecting inwardly along the bar —2— some distance from the adjacent lug —6—.

An operating spring —17— for the striker bar —7— is coiled around the extension —7'— and has its inner end engaged in an aperture —2'— in the bar —2— and its other end extended laterally with the adjacent arm of the striker bar for forcing the latter from its extreme open position at one side of the bar —2— to a closed position against the stops —8— mainly at the opposite side of said bar or through an arc of substantially one hundred and eighty degrees.

The means for holding the striker bar in its set or open position against the action of the coil spring —17— consists of a detent —18— having one end pivoted to the outer end of the extension —1'— and its other end movable into and out of engagement with a shoulder —19— on the bar —7— and also into and out of engagement with the underside of the plate —11— when the jaws are set in their open positions by the detent —13— and bait pan —12—.

The bar —2— and consequently the pivotal ends of the striker bar —7— are offset some distance to one side of the transverse center of the jaws indicated by the center line —a—, Figure 1, in the direction of extension of the plate —11— and set position of the arm of the striker bar —7— so as to cause said striker bar to gradually draw inwardly toward the center of the jaw trap when moving from its extreme open position to its extreme closed position and thereby to effect a similar inward draft and cramping of the body of the animal when the latter is caught by the crossing of the jaws.

The radius of movement of the central portion of the striker bar —7— is sufficiently long to enable that portion to travel over the outer edges of the jaws when the latter are closed but by reason of the contraction of the central portion of the striker bar to a width less than the distance between the jaws when opened it is necessary to set the striker bar in its open position previous to the setting of the jaws which involves the use of some means for temporarily holding the striker bar in its set position while the jaws are being set and for this purpose is provided the shoulder —19— on one arm of the striker bar to be engaged by the free end of the detent —18— as shown by dotted lines in Figure 1, it being understood that the pivotal connection between the detent —18— and outer end of the extension —1'— is beyond the path of movement of the central portion of the striker bar when the latter is opened or set and that the detent is then brought over the adjacent portion of the striker bar and its free end locked with the underside of the shoulder —19— as described.

After the jaws have been set and locked in their set positions the striker bar is temporarily held in its open position by hand to permit the detent —18— to be shifted from engagement with the shoulder —19— into engagement with the underside of the plate —11— as shown by full lines in Figure 1.

It is now evident that after the bait pan —12— is tripped by the engagement of an animal therewith it will release the detent —13— and allow the spring-actuated plate —11— to close the jaws upon the animal by which operation the plate —11— will be forced upwardly a sufficient distance to release the adjacent end of the detent —18— thereby allowing the striker bar —7— to be moved from its extreme open position at one end of the jaws to its extreme closed position across and partially beyond the opposite end of the jaws by means of the spring —17— thereby drawing the trapped animal inwardly toward the center of the jaws for effecting a more speedy and humanitarian dispatch of the animal due to the cramping motion of said animal around the end of the trap in the direction of closing movement of the striker bar.

The construction shown in Figures 4 and 5 is quite similar to that shown in Figures 1, 2 and 3 except that the bait pan —12—, detent —13—, and coiled springs —10— are mounted upon the bar —1— at the side of the bar —2— opposite the jaw operating member —11— and that the detent —13— is adapted to engage the upper edges of the adjacent ends of both jaws when the trap is set and that the corresponding ends of the coiled springs —10— are extended beyond the undersides of the opposite ends of the set jaws and united to each other to form the jaw-operated plate or member —11—.

Another slight difference is that the shoulder as —19— on the striker bar —7— is made in the form of a medial band extending around and fastened to the adjacent portion of the striker bar as shown in Figure 1 and is adapted to be engaged by the free end of the detent —18—.

It will be observed that one end of the bar —2— opposite the coiled spring —17— is somewhat shorter than that shown in Figures 1, 2, and 3 and that the corresponding arm of the striker bar extends directly out from its adjacent lug —6— and therefore the striker bar is somewhat shorter than that previously described.

Otherwise the construction and operation of the trap shown in Figures 4 and 5 is quite similar to that shown in Figures 1, 2 and 3 and the same references numerals are used to describe corresponding parts.

What I claim is:

1. An animal trap comprising a frame, jaws pivotally mounted upon the frame, a spring-actuated member for closing the jaws, animal-releasable means for holding the jaws in their open position, a striker bar pivoted to the frame to swing about an axis at right angles to the jaws from a position at one side of a medial line between the ends of the jaws to a position at the opposite side of said line, a detent pivoted to the frame and movable into and out of engagement with a part of the striker bar for holding the said bar in its open position while the jaws are being set, said detent being movable into engagement with the spring-actuated jaw-operating member after the jaws are set to delay the closing movement of the striker bar until after the jaws have been released.

2. An animal trap comprising a frame, cooperative jaws pivoted to the frame, a spring-actuated member for closing the jaws, animal-releasable means for holding the jaws open, a striker bar pivoted to the frame to swing about an axis some distance to one side of a medial line between the ends of the jaws, spring-actuated means for operating the striker bar, and a detent controlled by the jaws for holding the striker bar in its set position, and a detent pivoted to the frame and movable into and out of interlocking engagement with the striker bar for temporarily holding said striker bar in its set position, said detent being also movable into engagement with the jaw closing member when the jaws are set and releasable by the closing of the jaws to release the striker bar.

3. An animal trap comprising a frame, jaws pivotally mounted upon the frame, a spring-actuated member for closing the jaws, animal-releasable means for holding the jaws in their open position, a striker bar pivoted to the frame to swing about an axis at right angles to the jaws, a detent pivoted to the frame and movable into and out of engagement with a part of the striker bar for holding the said bar in its open position while the jaws are being set, said detent being movable into engagement with the spring-actuated jaw-operating member after the jaws are set to delay the closing movement of the striker bar until after the jaws have been released.

In witness whereof I have hereunto set my hand this twenty-third day of January, 1925.

MILFORD J. NEWHOUSE.